(12) United States Patent
Li et al.

(10) Patent No.: US 11,463,172 B2
(45) Date of Patent: Oct. 4, 2022

(54) APPARATUS AND METHOD FOR MONITORING POLARIZATION CHANGE

(71) Applicant: Fujitsu Limited, Kawasaki (JP)

(72) Inventors: Jingnan Li, Beijing (CN); Yangyang Fan, Beijing (CN); Zhenning Tao, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/491,999

(22) Filed: Oct. 1, 2021

(65) Prior Publication Data

US 2022/0149941 A1 May 12, 2022

(30) Foreign Application Priority Data

Nov. 6, 2020 (CN) .......................... 202011229046.2

(51) Int. Cl.
*H04B 10/00* (2013.01)
*H04B 10/2569* (2013.01)
(Continued)

(52) U.S. Cl.
CPC ..... *H04B 10/2569* (2013.01); *H04B 10/2513* (2013.01); *H04B 10/2572* (2013.01); *H04J 14/06* (2013.01)

(58) Field of Classification Search
CPC ............ H04B 10/2569; H04B 10/2513; H04B 10/2572; H04B 10/2507; H04B 10/40; H04B 10/6791; H04B 10/616; H04B 10/6162; H04B 10/0795; H04B 10/07953; H04B 10/0773; H04J 14/06
(Continued)

(56) References Cited

U.S. PATENT DOCUMENTS

| 2016/0204894 A1* | 7/2016 | Dong ................. H04B 10/5053 398/65 |
| 2019/0149231 A1 | 5/2019 | Li et al. |

(Continued)

FOREIGN PATENT DOCUMENTS

| CN | 107809282 A | 3/2018 |
| CN | 109802723 A | 5/2019 |

(Continued)

OTHER PUBLICATIONS

T.Ye, X. Su and K. Zhang, et al., "A polarization change monitor by eige nvalue analysis in coherent receiver", Proc. Optical Fiber Communication Conference; OFC 2019 © 2019; Optical Society of America (3 pages).

(Continued)

*Primary Examiner* — Hanh Phan
(74) *Attorney, Agent, or Firm* — Staas & Halsey LLP

(57) ABSTRACT

An apparatus and method to monitor a polarization change by inserting pilot signals in a transmission signal and converting the pilot signals in the receiving signal from a Jones space into a Stokes space. A velocity of a polarization change of the optical link is estimated by using the Stokes vectors of the pilot signals, thereby directly and accurately estimating the polarization change of the optical link. Moreover, estimation of the velocity of the polarization may be applicable where rotation of state of polarization and polarization-dependent loss coexist in an optical link.

10 Claims, 12 Drawing Sheets

(51) Int. Cl.
*H04B 10/2513* (2013.01)
*H04B 10/2507* (2013.01)
*H04J 14/06* (2006.01)

(58) Field of Classification Search
USPC ....... 398/147, 158, 159, 152, 65, 79, 81, 33,
398/38, 135, 136, 202, 208, 209, 25, 26,
398/27
See application file for complete search history.

(56) References Cited

U.S. PATENT DOCUMENTS

2020/0106521 A1* 4/2020 Ye ..................... H04B 10/616
2020/0264368 A1   8/2020 Qi et al.
2020/0382235 A1* 12/2020 Matsuda ................ H04J 14/06

FOREIGN PATENT DOCUMENTS

CN   110971294 A   4/2020
CN   111585645 A   8/2020

OTHER PUBLICATIONS

Y. Qi, T. Ye and Y. Fan, et al., Polarization Change Monitor Based on Jointly Applied Constant Modulus Algorithm and Carrier Phase Recovery in Coherent Receiver, 2019 24th OptoElectronics and Communications Conference (OECC) and 2019 International Conference on Photonics in Switching and Computing (PSC), 2019, TuB2-4; pp. 1-3 (3 pages).

* cited by examiner

APPARATUS AND METHOD FOR MONITORING POLARIZATION CHANGE

CROSS-REFERENCE TO RELATED APPLICATIONS

This application claims priority under 35 USC 119 to Chinese patent application No. 202011229046.2, filed on Nov. 6, 2020, in the China National Intellectual Property Administration, the entire contents of which are incorporated herein by reference.

TECHNICAL FIELD

This disclosure relates to the field of communication technologies, and in particular to an apparatus and method for monitoring a polarization change.

BACKGROUND

Coherent optical communications systems occupy important positions in communications transmission networks for their advantages of huge transmission bandwidths, great expansion potentials, extremely low transmission losses and low costs, etc. In a coherent optical communications system, in order to ensure stable transmission of signals, an effective method is needed in an optical transceiver system to monitor and deal with various state changes of optical fiber links in the natural environment. Researches consider that monitoring polarization changes is helpful to that an optical transceiver quickly responds, analyzes and repairs damages. That is, it is desirable that by monitoring a polarization change of a signal in an optical link, state changes of optical fibers in the link may be accurately reflected.

Currently, for a coherent optical receiver, adaptive equalization (AEQ) is usually used to achieve polarization demultiplexing. When an optical fiber link is affected by mechanical vibration, and lightning strike, etc., it will produce rapid rotation of state of polarization (RSOP). Coefficients of adaptive equalization may be used to indirectly estimate a polarization change in the optical link.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, following defects exist in the method for estimating the polarization change in the optical link according to the coefficients of adaptive equalization in the relevant art: first, adaptive equalization balances noise enhancement while estimating an inverse of a channel, and its coefficients are usually not strictly equal to an inverse of a transmission link, in other words, using the coefficients of the adaptive equalization to estimate the polarization change in the link will be inaccurate; second, an ability of the adaptive equalization to estimate a current polarization change is limited by its update rate. When the update rate of the adaptive equalization is insufficient to track high-velocity rotation of state of polarization, the coefficients of the adaptive equalization will no longer accurately reflect the polarization change of the link, hence, the estimated performance will be degraded; in addition, when rotation of state of polarization and polarization-dependent loss (PDL) coexist in the optical link, a total polarization change will be very complicated, and errors of estimation by simple adaptive equalization coefficients will increase.

In order to solve at least one of the above problems, embodiments of this disclosure provide an apparatus and method for monitoring a polarization change.

According to a first aspect of the embodiments of this disclosure, there is provided an apparatus for monitoring a polarization change, the apparatus including: a receiving unit configured to receive a receiving signal obtained after a transmission signal is propagated via an optical link, pilot signals being inserted into the transmission signal and being located on a plane in a Stokes space; a converting unit configured to convert pilot signals in the receiving signal from a Jones space into the Stokes space to obtain Stokes vectors of the pilot signals; and an estimating unit configured to estimate a velocity of a polarization change of the optical link according to the Stokes vectors of the pilot signals.

According to a second aspect of the embodiments of this disclosure, there is provided a control apparatus for adaptive equalization, the apparatus including: the apparatus for monitoring a polarization change described in the first aspect of the embodiments of this disclosure configured to obtain a velocity of a polarization change of the optical link; and a controlling unit configured to control an update rate of adaptive equalization according to the velocity of a polarization change of the optical link.

According to a third aspect of the embodiments of this disclosure, there is provided an optical receiver, including the apparatus described in the first or second aspect of the embodiments of this disclosure.

According to a fourth aspect of the embodiments of this disclosure, there is provided a method for monitoring a polarization change, the method including: receiving a receiving signal obtained after a transmission signal is propagated via an optical link, pilot signals being inserted into the transmission signal and being located on a plane in a Stokes space; converting pilot signals in the receiving signal from a Jones space into the Stokes space to obtain Stokes vectors of the pilot signals; and estimating a velocity of a polarization change of the optical link according to the Stokes vectors of the pilot signals.

An advantage of the embodiments of this disclosure exists in that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link. Moreover, they are also applicable to a case where rotation of state of polarization and polarization-dependent loss coexist in the optical link.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides an apparatus for monitoring a polarization change, provided, for example, at an optical receiver end of the optical communication system.

Figure 1:
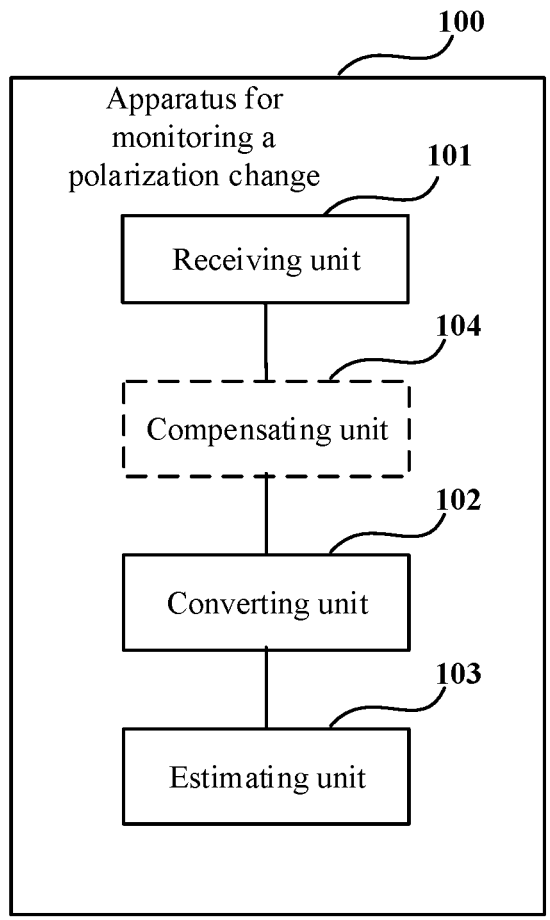
FIG. 1 is schematic diagram of the apparatus for monitoring a polarization change of Embodiment 1 of this disclosure.

FIG. 1 is schematic diagram of the apparatus for monitoring a polarization change of Embodiment 1 of this disclosure. As shown in FIG. 1, an apparatus 100 for monitoring a polarization change includes:

a receiving unit 101 configured to receive a receiving signal obtained after a transmission signal is propagated via an optical link, pilot signals being inserted into the transmission signal and being located on a plane in a Stokes space;

a converting unit 102 configured to convert pilot signals in the receiving signal from a Jones space into the Stokes space to obtain Stokes vectors of the pilot signals; and an estimating unit 103 configured to estimate a velocity of a polarization change of the optical link according to the Stokes vectors of the pilot signals.

It can be seen from the above embodiment that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link.

In the embodiment of this disclosure, the transmission signal is transmitted by a transmitter of the communication system, and the pilot signals is inserted into the transmission signal, which may also be referred to as pilot symbols (PSs).

In the embodiment of this disclosure, the pilot signals may be various types of pilot signals. For example, the pilot signals are dual-polarization (DP) quadrature phase shift keying (QPSK) pilot signals. The pilot signals of a DP-QPSK type may be expressed in the Jones space as:

$$\begin{bmatrix} E_x(t) \\ E_y(t) \end{bmatrix} = \frac{1}{\sqrt{2}} \begin{bmatrix} e^{j\varphi_x(t)} \\ e^{j\varphi_y(t)} \end{bmatrix} = \frac{1}{\sqrt{2}} \begin{bmatrix} e^{j(k_x(t)\frac{\pi}{2} - \frac{\pi}{4})} \\ e^{j(k_y(t)\frac{\pi}{2} - \frac{\pi}{4})} \end{bmatrix}, k_{x,y} \in [1, 2, 3, 4]; \quad (1)$$

where, t denotes time, and $k_{x,y}$ corresponds to 4 QPSK constellation points in two polarization states.

A formula for converting the pilot signals from the Jones space to the Stokes space is:

$$S(t) = \begin{bmatrix} S_0(t) \\ S_1(t) \\ S_2(t) \\ S_3(t) \end{bmatrix} = \begin{bmatrix} E_x(t)E_x^*(t) + E_y(t)E_y^*(t) \\ E_x(t)E_x^*(t) - E_y(t)E_y^*(t) \\ E_x(t)E_y^*(t) + E_y(t)E_x^*(t) \\ j(E_x(t)E_y^*(t) - E_y(t)E_x^*(t)) \end{bmatrix}; \quad (2)$$

where, $S_0$ is signal power, $S_1$, $S_2$ and $S_3$ are three-dimensional coordinates of the signal in the Stokes space.

Substituting formula (1) in formula (2) may obtain the Stokes vectors of the transmitted pilot signals:

$$S_{T,k}(t) = \begin{bmatrix} S_{0,T,k}(t) \\ S_{1,T,k}(t) \\ S_{2,T,k}(t) \\ S_{3,T,k}(t) \end{bmatrix} = \begin{bmatrix} 1 \\ 0 \\ \cos(k(t)\frac{\pi}{2} - \frac{\pi}{2}) \\ \sin(k(t)\frac{\pi}{2} - \frac{\pi}{2}) \end{bmatrix}, k \in [1, 2, 3, 4]; \quad (3)$$

where, k denotes the 4 types of pilot signals in the Stokes space.

Figure 2:
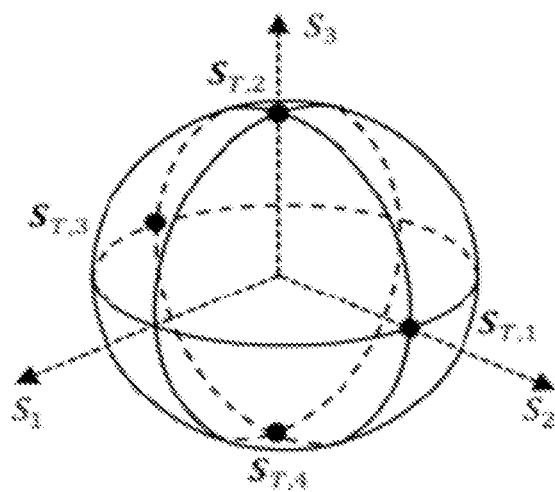
FIG. 2 is a schematic diagram of Stokes vectors of a transmitted pilot signal of Embodiment 1 of this disclosure.

FIG. 2 is a schematic diagram of Stokes vectors of a transmitted pilot signal of Embodiment 1 of this disclosure. As shown in FIG. 2, the 4 types of pilot signals are 4 intersections of a Poincare sphere spherical surface and the axis S2 and the axis S3, and the 4 types of pilot signals are located in the same plane in the Stokes space.

In the embodiment of this disclosure, the receiving unit 101 receives the receiving signal obtained after the transmission signal is propagated via the optical link.

As the pilot signals are affected by rotation of state of polarization (RSOP), a polarization-dependent loss (PDL) and an amplified spontaneous emission (ASE) noise in the link during transmission, the signal is received coherently at the receiver end. For example, the received signal may be expressed as:

$$\begin{bmatrix} R_x(t) \\ R_y(t) \end{bmatrix} = T(t) \begin{bmatrix} E_x(t) \\ E_y(t) \end{bmatrix} e^{j\Delta\omega t} e^{j\varphi(t)} + n(t); \quad (4)$$

where, $\Delta\omega$ is a frequency deviation between an optical carrier and receiver optical local oscillator (LO), $\varphi(t)$ is a phase noise of the optical carrier, n(t) is an ASE noise, and T(t) is a total link response containing the RSOP and the PDL.

In the embodiment of this disclosure, the converting unit 102 converts the pilot signals in the receiving signal from the Jones space to the Stokes space to obtain the Stokes vectors of the pilot signals.

For example, substituting formula (4) in formula (2) may obtain the Stokes vectors of the received pilot signals:

$$S_{R,k}(t) = \begin{bmatrix} S_{0,R,k}(t) \\ S_{1,R,k}(t) \\ S_{2,R,k}(t) \\ S_{3,R,k}(t) \end{bmatrix}, k \in [1, 2, 3, 4]; \quad (5)$$

where, k denotes the 4 types of pilot signals in the Stokes space.

In this way, influences of the frequency deviation and phase noise may be eliminated.

Figure 3:
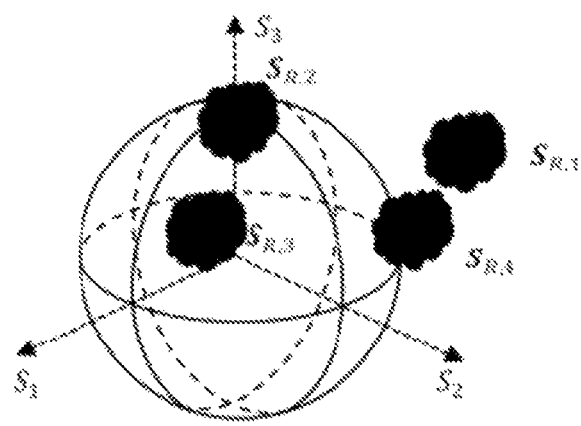
FIG. 3 is a schematic diagram of Stokes vectors of a received pilot signal of Embodiment 1 of this disclosure.

FIG. 3 is a schematic diagram of the Stokes vectors of the received pilot signals of Embodiment 1 of this disclosure. As shown in FIG. 3, on the one hand, due to the influences of RSOP and PDL, the received pilot signals will deviate from the original positions in the Stokes space; and on the other hand, due to the influence of ASE noise, the received pilot signals will diverge.

In the embodiment of this disclosure, the estimating unit 103 is configured to estimate the polarization change velocity of the optical link according to the Stokes vectors of the pilot signals. A structure and function of the estimating unit 103 shall be described below in detail.

In the embodiment of this disclosure, the estimating unit 103 may use various methods to estimate the polarization change velocity of the optical link according to the Stokes vectors of the pilot signals. For example, a polarization change matrix is estimated first, and then the polarization change velocity of the optical link is estimated according to polarization change matrices at different time instants, that is, the polarization change of the optical link is estimated first, and then the polarization change velocity is estimated. For another example, the polarization change velocity of the optical link is estimated according to Stokes vectors at different time instants.

In the following, firstly, a method of first estimating the polarization change matrix and then estimating the polarization change velocity of the optical link based on the polarization change matrix at different times will be specifically described.

Figure 4:
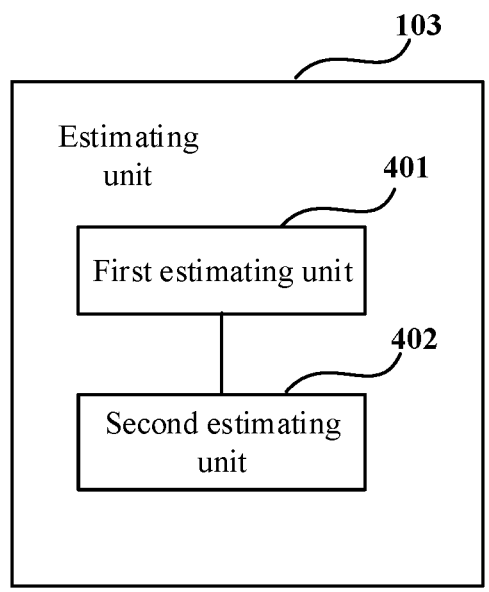
FIG. 4 is a schematic diagram of the estimating unit of Embodiment 1 of this disclosure.

FIG. 4 is a schematic diagram of the estimating unit of Embodiment 1 of this disclosure. As shown in FIG. 4, the estimating unit 103 includes:

a first estimating unit 401 configured to estimate a polarization change matrix according to the Stokes vectors of the pilot signals; and a second estimating unit 402 configured to estimate the velocity of a polarization change of the optical link according to polarization change matrices at different time instants.

Figure 5:
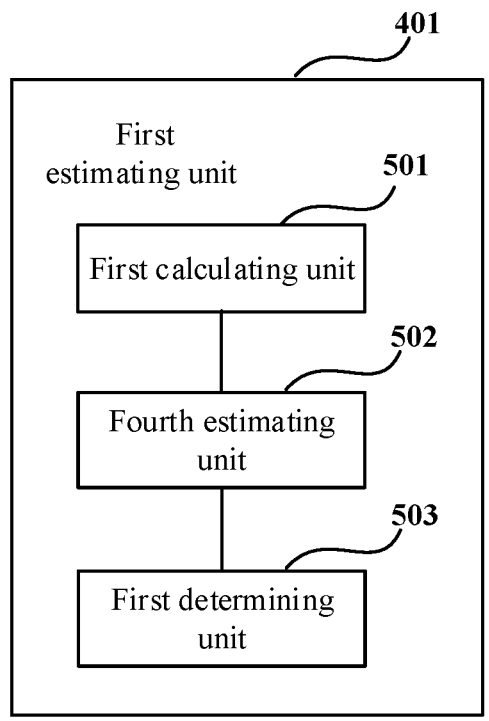
FIG. 5 is a schematic diagram of the first estimating unit of Embodiment 1 of this disclosure.

FIG. 5 is a schematic diagram of the first estimating unit of Embodiment 1 of this disclosure. As shown in FIG. 5, the first estimating unit 401 includes:

a first calculating unit 501 configured to perform classified averaging on the Stokes vectors of the pilot signals;

a fourth estimating unit 502 configured to estimate a polarization-dependent loss (PDL) estimation matrix and a rotation of state of polarization (RSOP) estimation matrix, or estimate a rotation of state of polarization estimation matrix, according to a classified averaged Stokes vector of the pilot signals; and a first determining unit 503 configured to determine the polarization change matrix according to the polarization-dependent loss estimation matrix and the rotation of state of polarization estimation matrix, or take the rotation of state of polarization estimation matrix as the polarization change matrix.

In the embodiment of this disclosure, the first calculating unit 501 is configured to perform classified averaging on the Stokes vectors of the pilot signals, so as to eliminate the influence of ASE noise.

For example, Stokes vectors of the four types of pilot signals after classified averaging are:

$$\overline{S_{R,k}(t)} = \begin{bmatrix} \overline{S_{1,R,k}(t)} \\ \overline{S_{2,R,k}(t)} \\ \overline{S_{3,R,k}(t)} \end{bmatrix} = \begin{bmatrix} \frac{1}{T}\sum_{t-T/2}^{t+T/2} S_{1,R,k}(t) \\ \frac{1}{T}\sum_{t-T/2}^{t+T/2} S_{2,R,k}(t) \\ \frac{1}{T}\sum_{t-T/2}^{t+T/2} S_{3,R,k}(t) \end{bmatrix}, k \in [1, 2, 3, 4]; \quad (6)$$

where, T is an average time.

Figure 6:
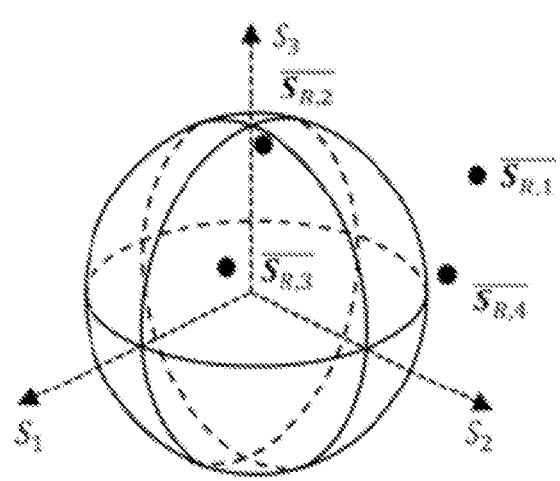
FIG. 6 is a schematic diagram of the classified averaged pilot signal of Embodiment 1 of this disclosure.

FIG. 6 is a schematic diagram of the classified averaged pilot signal of Embodiment 1 of this disclosure. As shown in FIG. 6, a Stokes vector $\overline{S_{R,k}}$ of the classified averaged pilot signals is obtained.

In the embodiment of this disclosure, the fourth estimating unit 502 estimates the polarization-dependent loss (PDL) estimation matrix and the rotation of state of polarization (RSOP) estimation matrix according to the classified averaged Stokes vector of the pilot signals, or estimates the rotation of state of polarization estimation matrix.

For example, when the PDL in the link may be ignored, only the RSOP estimation matrix is estimated.

In the embodiment of this disclosure, the fourth estimating unit 502 may use two orders to estimate the PDL estimation matrix and the RSOP estimation matrix. The first order is that the PDL is estimated first, then the RSOP is estimated, and the second order is that the RSOP is estimated first, and then the PDL is estimated, which shall be described below in details.

Figure 7:
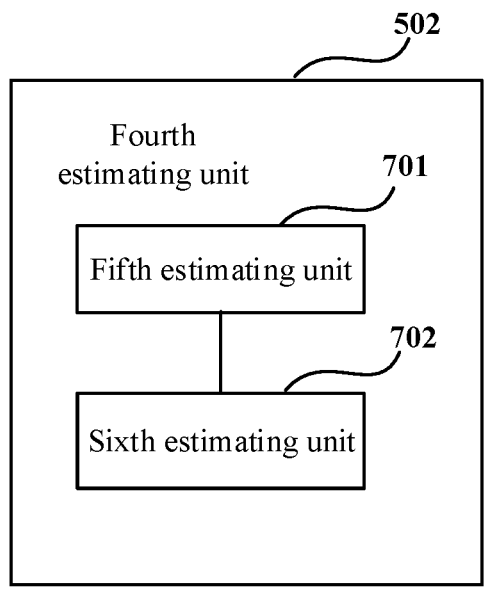
FIG. 7 is a schematic diagram of the fourth estimating unit of Embodiment 1 of this disclosure.

FIG. 7 is a schematic diagram of the fourth estimating unit of Embodiment 1 of this disclosure. As shown in FIG. 7, the fourth estimating unit 502 includes:

a fifth estimating unit 701 configured to estimate the PDL estimation matrix according to a barycentric coordinate of the classified averaged Stokes vector of the pilot signals and perform PDL compensation; and a sixth estimating unit 702 configured to estimate the RSOP estimation matrix according to a PDL compensated Stokes vector of the pilot signals.

A particular calculation process shall be described below.

Figure 8:
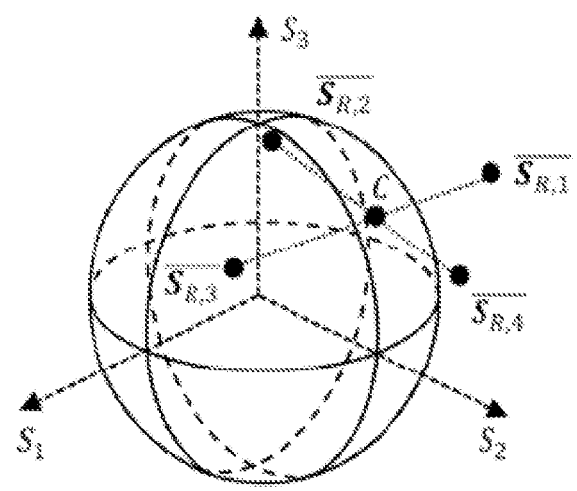
FIG. 8 is a schematic diagram of the barycentric of the pilot signals of Embodiment 1 of this disclosure.
Figure 9:
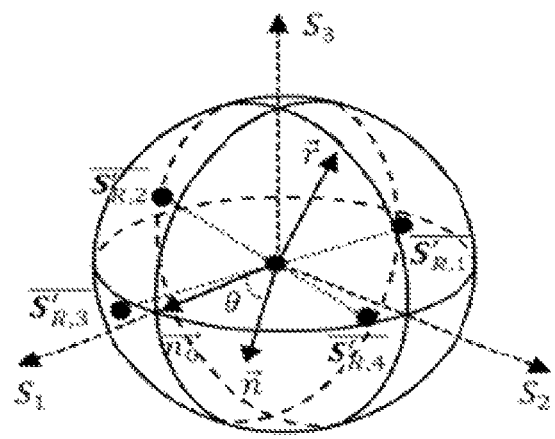
FIG. 9 is a schematic diagram of the PDL compensated pilot signal of Embodiment 1 of this disclosure.
Figure 10:
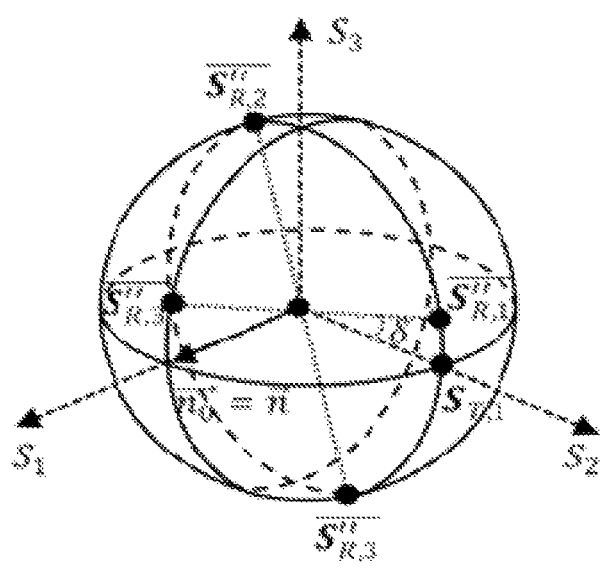
FIG. 10 is a schematic diagram of four types of pilot signals recovered to an S2-S3 plane of Embodiment 1 of this disclosure.

FIG. 8 is a schematic diagram of the barycentric of the pilot signals of Embodiment 1 of this disclosure, FIG. 9 is a schematic diagram of the PDL compensated pilot signal of Embodiment 1 of this disclosure, and FIG. 10 is a schematic diagram of four types of pilot signals recovered to an S2-S3 plane of Embodiment 1 of this disclosure.

In the embodiment of this disclosure, further averaging the four types of classified averaged pilot signals may obtain a barycentric coordinate C(t) of current pilot signals, as shown in FIG. 8:

$$C(t) = \begin{bmatrix} C_1(t) \\ C_2(t) \\ C_3(t) \end{bmatrix} = \begin{bmatrix} \frac{1}{4}\sum_{k=1}^{4} \overline{S_{1,R,k}(t)} \\ \frac{1}{4}\sum_{k=1}^{4} \overline{S_{2,R,k}(t)} \\ \frac{1}{4}\sum_{k=1}^{4} \overline{S_{3,R,k}(t)} \end{bmatrix}. \quad (7)$$

At this moment, the PDL estimation matrix may be obtained:

$$M_{PDL}(t) = U_2\left(-\frac{\pi}{2}\right)D(-C_3(t))U_2\left(\frac{\pi}{2}\right)U_3\left(-\frac{\pi}{2}\right)D(-C_2(t))U_3\left(\frac{\pi}{2}\right)D(C_1(t)); \quad (8)$$

where, $U_2$ and $U_3$ denote rotation matrices $$U_2(\sigma) = \begin{bmatrix} \cos(\sigma/2) & j\sin(\sigma/2) \\ j\sin(\sigma/2) & \cos(\sigma/2) \end{bmatrix} \text{ and } U_3(\chi) = \begin{bmatrix} \cos(\chi/2) & -\sin(\chi/2) \\ \sin(\chi/2) & \cos(\chi/2) \end{bmatrix}$$

respectively rotating around axis S2 clockwise and axis S3 counterclockwise. And the PDL is compensated in the Stokes space, that is, the barycentric coordinate C(t) of the four types of pilot signals is moved to the original. In this case, the Stokes vectors of the 4 types of pilot signals are:

$$\overline{S'_{R,k}(t)} = \begin{bmatrix} \overline{S'_{1,R,k}(t)} \\ \overline{S'_{2,R,k}(t)} \\ \overline{S'_{3,R,k}(t)} \end{bmatrix} = \overline{S_{R,k}(t)} - C(t) = \begin{bmatrix} \overline{S_{1,R,k}(t)} \\ \overline{S_{2,R,k}(t)} \\ \overline{S_{3,R,k}(t)} \end{bmatrix} - \begin{bmatrix} C_1(t) \\ C_2(t) \\ C_3(t) \end{bmatrix}, \quad (9)$$

$$k \in [1, 2, 3, 4].$$

The PDL compensated pilot signals are as shown in FIG. 9. Two neighboring types of pilot signals, such as type 1 and type 2 of pilot signals, may be cross-multiplication and normalization processed to obtain plane normal vectors of the pilot signals:

$$\vec{n}(t) = \frac{\overline{S'_{R,1}(t)} \times \overline{S'_{R,2}(t)}}{\left|\overline{S'_{R,1}(t)} \times \overline{S'_{R,2}(t)}\right|} = \begin{bmatrix} n_1(t) \\ n_2(t) \\ n_3(t) \end{bmatrix}. \quad (10)$$

In the embodiment of this disclosure, the normal vector may be obtained by cross-multiplication and normalization according to a pair of neighboring two types of pilot signals, or respective normal vectors may be obtained by cross-multiplication and normalization according to multiple pairs of neighboring two types of pilot signals and then the normal vector may be obtained by averaging and normalization.

A rotation axis and rotation angle of the normal vector are obtained according to a unit vector $\vec{n_0}=[1, 0, 0]^T$ and a plane normal vector $\vec{n}(t)$:

$$\vec{r}(t) = \frac{\vec{n_0} \times \vec{n}(t)}{|\vec{n_0} \times \vec{n}(t)|}, \quad (11)$$

$$\theta(t) = \arccos\left(\frac{\vec{n_0} \cdot \vec{n}(t)}{|\vec{n_0}||\vec{n}(t)|}\right). \quad (12)$$

Hence, a rotation matrix of the normal vector in the Jones space is obtained:

$$U_{normal}(t) = \cos\left(\frac{\theta(t)}{2}\right)I + j\sin\left(\frac{\theta(t)}{2}\right)(\vec{r}(t)\cdot\sigma); \quad (13)$$

where, I is a unit matrix, and σ is a Pauli matrix.

The transformation relationship between polarization rotation in the Jones space and the Stokes space is:

$$U = \begin{bmatrix} u_1 & u_2 \\ -u_2^* & u_1^* \end{bmatrix} \rightarrow R = \begin{bmatrix} |u_1|^2 - |u_2|^2 & -2\text{Re}(u_1 u_2^*) & -2\text{Im}(u_1 u_2^*) \\ 2\text{Re}(u_1 u_2) & \text{Re}(u_1^2 - u_2^2) & \text{Im}(u_1^2 + u_2^2) \\ -2\text{Im}(u_1 u_2) & -\text{Im}(u_1^2 - u_2^2) & \text{Re}(u_1^2 + u_2^2) \end{bmatrix}. \quad (14)$$

Substituting formula (13) in formula (14), the rotation matrix $R_{normal}(t)$ in the Stokes space is obtained, and $\overline{S_{R,k}}''(t)=[\overline{S_{1,R,k}}''(t), \overline{S_{2,R,k}}''(t), \overline{S_{3,R,k}}''(t)]^T$ is obtained by rotating the pilot signals. In this case, the plane normal vector coincides with the unit vector $\vec{n}_0=[1, 0, 0]^T$, and the 4 types of pilot signals are recovered to the plane S2-S3, as shown in FIG. 10.

According to a relative relationship between the current Stokes vector $\overline{S_{R,1}}''(t)$ of the first type of pilot signal and the transmitted Stokes vector $S_{T,1}(t)$ in the plane S2-S3, its rotation angle in the plane S2-S3 and the corresponding rotation matrix may be calculated:

$$\delta(t) = \arctan\left(\frac{\overline{S_{3,R,1}''}(t)}{\overline{S_{2,R,1}''}(t)}\right), \quad (15)$$

$$U_{retarder}(t) = \begin{bmatrix} e^{j\frac{\delta(t)}{2}} & 0 \\ 0 & e^{-j\frac{\delta(t)}{2}} \end{bmatrix}. \quad (16)$$

Hence, the RSOP estimation matrix is obtained:

$$U_{RSOP}(t)=U_{retarder}(t)U_{normal}(t) \quad (17)$$

In the embodiment of this disclosure, it can be seen from formula (14) that a period of the polarization rotation in the Stokes space is twice that in the Jones space, hence, performing the polarization estimation in the Stokes space may introduce a phase jump in the Jones space, that is, $$U_{RSOP}(t) = \begin{bmatrix} e^{-j\frac{\varphi}{2}} & 0 \\ 0 & e^{j\frac{\varphi}{2}} \end{bmatrix} U_{RSOP}(t), \varphi = 0 \text{ or } 2\pi. \quad (18)$$

This phase jump will cause discontinuity of the RSOP estimation matrix. As the polarization rotation is a continuous physical process, the polarization estimation should also be continuous. Assuming that last polarization estimation was correct, current polarization estimation may undergo a phase jump. In this case, the RSOP estimation matrix may be expressed as:

$$U_{RSOP}(t-\Delta t) = \begin{bmatrix} u_1(t-\Delta t) & u_2(t-\Delta t) \\ -u_2^*(t-\Delta t) & u_1^*(t-\Delta t) \end{bmatrix}^{-1} = \begin{bmatrix} u_1^*(t-\Delta t) & -u_2(t-\Delta t) \\ u_2^*(t-\Delta t) & u_1(t-\Delta t) \end{bmatrix} \quad (19)$$

$$U_{RSOP}(t) = \begin{bmatrix} e^{-j\frac{\varphi}{2}} & 0 \\ 0 & e^{j\frac{\varphi}{2}} \end{bmatrix} \begin{bmatrix} u_1(t) & u_2(t) \\ -u_2^*(t) & u_1^*(t) \end{bmatrix}^{-1} = \begin{bmatrix} u_1^*(t)e^{-j\frac{\varphi}{2}} & -u_2(t)e^{-j\frac{\varphi}{2}} \\ u_2^*(t)e^{j\frac{\varphi}{2}} & u_1(t)e^{j\frac{\varphi}{2}} \end{bmatrix} \quad (20)$$

By calculating elements in the current RSOP estimation matrix and the last RSOP estimation matrix, whether a phase jump occurs may be determined, which is as follows:

$$\Delta = U_{RSOP,11}(t)\cdot conj(U_{RSOP,11}(t-\Delta t)) + \quad (21)$$
$$U_{RSOP,12}(t)\cdot conj(U_{RSOP,12}(t-\Delta t)) =$$
$$u_1^*(t)e^{-j\frac{\varphi}{2}}\cdot conj(u_1^*(t-\Delta t)) - u_2(t)e^{-j\frac{\varphi}{2}}\cdot conj(-u_2(t-\Delta t)) \approx$$
$$(|u_1^*(t)|^2 + |u_2(t)|^2)e^{-j\frac{\varphi}{2}} \approx \pm 1;$$

where, $U_{RSOP,11}$ and $U_{RSOP,12}$ respectively denote elements in the first row, first column and first row, second column of the RSOP estimation matrix. When $\Delta\approx1$, a phase jump does not occur, and the RSOP estimation matrix is continuous; and when $\Delta\approx-1$, a phase jump occurs, and the RSOP estimation matrix is discontinuous. In this case, the RSOP estimation matrix needs to be corrected, and a correction matrix is:

$$U_{phase\ jump} = \begin{bmatrix} e^{j\pi} & 0 \\ 0 & e^{-j\pi} \end{bmatrix}. \quad (22)$$

And the corrected RSOP estimation matrix is:

$$U_{RSOP}(t) = \begin{cases} U_{RSOP}(t) & \Delta\approx 1 \\ U_{phase\ jump}U_{RSOP}(t) & \Delta\approx -1 \end{cases}. \quad (23)$$

In the embodiment of this disclosure, when the PDL in the optical link is non-negligible, the first determining unit 503 determines the polarization change matrix according to the PDL estimation matrix and the RSOP estimation matrix, such as multiplying the RSOP estimation matrix by the PDL estimation matrix to obtain the total polarization estimation matrix in the optical link, that is, the polarization change matrix:

$$M_{total}(t)=U_{RSOP}(t)M_{PDL}(t) \quad (24);$$

where, $U_{RSOP}(t)$ denotes the RSOP estimation matrix, and $M_{PDL}(t)$ denotes the PDL estimation matrix.

Figure 11:
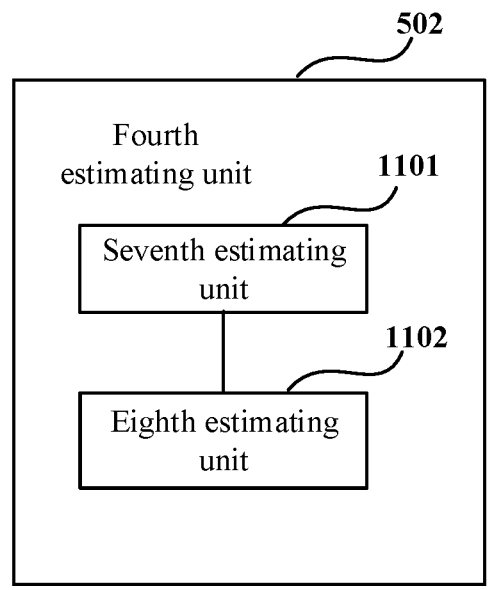
FIG. 11 is another schematic diagram of the fourth estimating unit of Embodiment 1 of this disclosure.

FIG. 11 is another schematic diagram of the fourth estimating unit of Embodiment 1 of this disclosure. As shown in FIG. 11, the fourth estimating unit 502 includes:

a seventh estimating unit 1101 configured to estimate the rotation of state of polarization estimation matrix according to the classified averaged Stokes vector of the pilot signals and perform rotation of state of polarization compensation; and an eighth estimating unit 1102 configured to estimate the polarization-dependent loss estimation matrix according to a barycentric coordinate of the rotation of state of polarization compensated Stokes vectors of the pilot signals.

A particular calculation process shall be described below.

Figure 12:
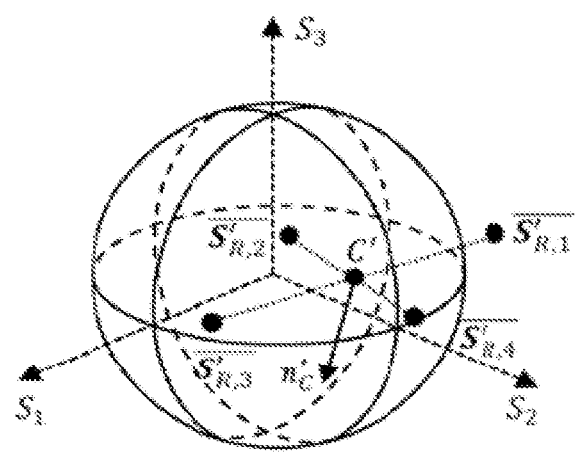
FIG. 12 is a schematic diagram of a step of recovering normal vectors of Embodiment 1 of this disclosure.
Figure 13:
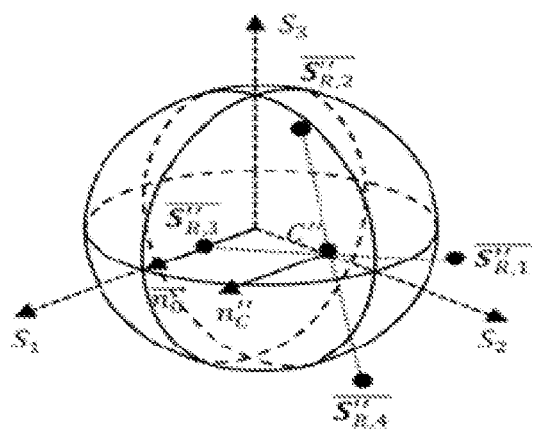
FIG. 13 is a schematic diagram of another step of recovering normal vectors of Embodiment 1 of this disclosure.
Figure 14:
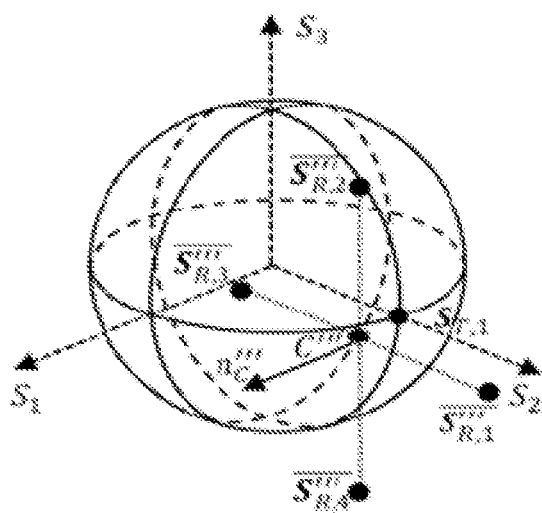
FIG. 14 is a schematic diagram of the pilot signals after being rotated of Embodiment 1 of this disclosure.

FIG. 12 is a schematic diagram of a step of recovering normal vectors of Embodiment 1 of this disclosure, FIG. 13 is a schematic diagram of another step of recovering normal vectors of Embodiment 1 of this disclosure, and FIG. 14 is a schematic diagram of the pilot signals after being rotated of Embodiment 1 of this disclosure.

According to formulae (7)-(10), coordinates $n_C(t)$ of the current normal vector may be obtained:

$$n_C(t) = \begin{bmatrix} n_{1,C}(t) \\ n_{2,C}(t) \\ n_{3,C}(t) \end{bmatrix} = \vec{n}(t) + C(t) = \begin{bmatrix} n_1(t) \\ n_2(t) \\ n_3(t) \end{bmatrix} + \begin{bmatrix} C_1(t) \\ C_2(t) \\ C_3(t) \end{bmatrix}. \quad (25)$$

A rotator is used to make S2 values of the barycentric coordinate C(t) and the normal vector coordinates $n_C(t)$ equal, and the rotation angle and rotation matrix are as follows respectively:

$$\theta(t) = \frac{1}{2}\arctan\left(\frac{C_2(t) - n_{2,C}(t)}{n_{1,C}(t) - C_1(t)}\right), \quad (26)$$

$$U_{rotator}(t) = \begin{bmatrix} \cos(\theta(t)) & -\sin(\theta(t)) \\ \sin(\theta(t)) & \cos(\theta(t)) \end{bmatrix}. \quad (27)$$

Its rotation matrix $R_{rotator}(t)$ in the Stokes space is obtained by substituting formula (27) in formula (14), and $\overline{S_{R,k}}'(t)=[\overline{S_{1,R,k}}'(t), \overline{S_{2,R,k}}'(t), \overline{S_{3,R,k}}'(t)]^T$, $C'(t)=[C_1'(t), C_2'(t), C_3'(t)]^T$ and $n_{C'}(t)=[n_{1,C}'(t), n_{2,C}'(t), n_{3,C}'(t)]^T$ are obtained by rotating the pilot signals $\overline{S_{R,k}}(t)$, their barycentric coordinate C(t) and the normal vector coordinates $n_C(t)$. And In this case, the normal vector is parallel with the plane S1-S3, as shown in FIG. 12.

Then a retarder of 45° is used to make S3 values of barycentric coordinate C'(t) and normal vector coordinates $n_{C'}(t)$ equal, and its rotation angle and rotation matrix are as follows respectively:

$$\delta_{45deg}(t) = \arctan\left(\frac{C_3'(t) - n_{3,C}'(t)}{C_1'(t) - n_{1,C}'(t)}\right), \quad (28)$$

$$U_{45deg\ retarder}(t) = \begin{bmatrix} \cos\left(\frac{\delta_{45deg}(t)}{2}\right) & -j\sin\left(\frac{\delta_{45deg}(t)}{2}\right) \\ -j\sin\left(\frac{\delta_{45deg}(t)}{2}\right) & \cos\left(\frac{\delta_{45deg}(t)}{2}\right) \end{bmatrix}. \quad (29)$$

Its rotation matrix $R_{45deg\ retarder}(t)$ in Stokes space is obtained by substituting formula (29) in formula (14), and $\overline{S_{R,k}}''(t)=[\overline{S_{1,R,k}}''(t), \overline{S_{2,R,k}}''(t), \overline{S_{3,R,k}}''(t)]^T$, $C''(t)=[C_1''(t), C_2''(t), C_3''(t)]^T$ and $n_{C''}(t)=[n_{1,C}''(t), n_{2,C}''(t), n_{3,C}''(t)]^T$ are obtained by rotating pilot signals $\overline{S_{R,k}}'(t)$, their barycentric coordinate C'(t) and normal vector coordinates $n_{C'}(t)$. In this case, a normal vector $n_{C'}(t)-C''(t)$ is in the same direction as a unit vector $\vec{n}_0 = [1, 0, 0]^T$, as shown in FIG. 13. If they are inverse, the pilot signals $n_{C'}(t)-C''(t)$, its barycentric coordinate C''(t) and normal vector coordinates $n_{C'}(t)$ need to be rotated by the $R_{rotator}$ by 180° in the Stokes space to make them be in the same direction, and the rotation matrix $U_{rotator}$ is rotated by 90° in the Jones space. A retarder of 0° is used to make S3 values of the barycentric coordinate C''(t) and the type 1 pilot signal $\overline{S_{R,1}}''(t)$ equal, and the rotation angle and rotation matrix are as follows respectively:

$$\delta_{0deg}(t) = \arctan\left(\frac{C_3''(t) - \overline{S_{3,R,1}}''(t)}{\overline{S_{2,R,1}}''(t) - C_2''(t)}\right), \quad (30)$$

$$U_{0deg\ retarder}(t) = \begin{bmatrix} e^{-j\frac{\delta_{0deg}(t)}{2}} & 0 \\ 0 & e^{j\frac{\delta_{0deg}(t)}{2}} \end{bmatrix}. \quad (31)$$

Its rotation matrix $R_{0deg\ retarder}(t)$ in the Stokes space is obtained by substituting formula (31) in formula (14), and $\overline{S_{R,k}}'''(t)=[\overline{S_{1,R,k}}'''(t), \overline{S_{2,R,k}}'''(t), \overline{S_{3,R,k}}'''(t)]^T$, $C'''(t)=[C_1'''(t), C_2'''(t), C_3'''(t)]^T$ and $n_{C}'''(t)=[n_{1,C}'''(t), n_{2,C}'''(t), n_{3,C}'''(t)]^T$ are obtained by rotating the pilot signals $\overline{S_{R,k}}''(t)$, its barycentric coordinate C''(t) and the normal vector coordinates n'(t). In this case, a vector $\overline{S_{R,1}}'''(t)-C'''(t)$ constituted by the barycentric and the type 1 pilot signal is in the same direction as Stokes vectors $S_{T,1}(t)=[0,1,0]^T$ of an original type 1 pilot signal, as shown in FIG. 14. If they are inverse, the pilot signals $\overline{S_{R,k}}'''(t)$, their barycentric coordinate C'''(t) and normal vector coordinates $n_C'''(t)$ need to be rotated by $R_{0deg\ retarder}$ by 180° in the Stokes space to make them be in the same direction, and a rotation matrix $U_{0deg\ retarder}$ is rotated by 90° in the Jones space. The above three rotation matrices are multiplied and are corrected by formulae (18)-(22), and the RSOP estimation matrix may be obtained:

$$U_{RSOP}(t) = \quad (32)$$
$$\begin{cases} U_{0deg\ retarder}(t) \cdot U_{45deg\ retarder}(t) \cdot U_{rotator}(t) & \Delta \approx 1 \\ U_{phase\ jump} \cdot U_{0deg\ retarder}(t) \cdot U_{45deg\ retarder}(t) \cdot U_{rotator}(t) & \Delta \approx -1 \end{cases}.$$

Substituting the barycentric coordinate $C'''(t)=[C_1'''(t), C_2'''(t), C_3'''(t)]^T$ in formula (8) may obtain the PDL estimation matrix:

$$M_{PDL}(t) = \quad (33)$$
$$U_2\left(-\frac{\pi}{2}\right)D(-C_3'''(t))U_2\left(\frac{\pi}{2}\right)U_3\left(-\frac{\pi}{2}\right)D(-C_2'''(t))U_3\left(\frac{\pi}{2}\right)D(C_1'''(t)).$$

Similar to formula (24), the PDL estimation matrix and the RSOP estimation matrix are multiplied to obtain the total polarization estimation matrix in the optical link, that is, the polarization change matrix:

$$M_{total}(t) = M_{PDL}(t)U_{RSOP}(t) \quad (34);$$

where, $M_{PDL}(t)$ denotes the PDL estimation matrix, and $U_{RSOP}(t)$ denotes the RSOP estimation matrix.

Estimating the polarization change matrix by the first estimating unit 401 is described above in detail. And after the polarization change matrix is obtained, the second estimating unit 402 estimates the polarization change velocity of the optical link according to the polarization change matrices at different moments.

Figure 15:
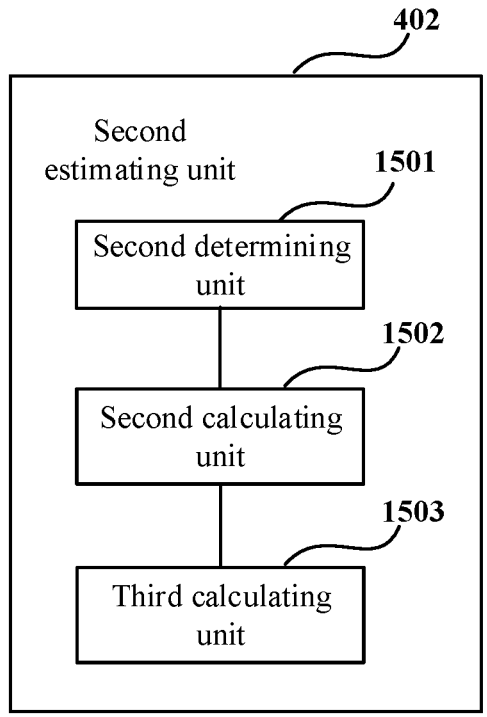
FIG. 15 is a schematic diagram of the second estimating unit of Embodiment 1 of this disclosure.

FIG. 15 is a schematic diagram of the second estimating unit of Embodiment 1 of this disclosure. As shown in FIG. 15, the second estimating unit 402 includes:

a second determining unit 1501 configured to determine a differential matrix of the polarization change matrices at two time instants;

a second calculating unit 1502 configured to calculate a polarization rotation angle of the pilot signals according to the differential matrix; and a third calculating unit 1503 configured to calculate the velocity of a polarization change of the optical link according to the polarization rotation angle of the pilot signals and an interval between the two time instants.

For example, for a case where the PDL in the optical link may be neglectable, the RSOP estimation matrix is directly taken as the polarization change matrix.

In the embodiment of this disclosure, the RSOP estimation matrix is obtained by formula (23) or formula (32), and a differential matrix (i.e. a polarization change matrix between two estimation instants) may be obtained according to the RSOP estimation matrices at different instants:

$$\Delta U(t) = U_{RSOP}(t) \cdot U_{RSOP}^{-1}(t-\Delta t) \quad (35)$$

where, $\Delta t$ is a time interval between two RSOP estimation matrices.

A polarization rotation trajectory of the pilot signals is calculated according to the differential matrix $\Delta U(t)$:

$$\Delta l(t) = \sqrt{4 - 4Re(\Delta U_e(t))^2} \quad (36);$$

where, $\Delta U_e(t)$ is an element in the first row and first column in $\Delta U(t)$, or an element in the second row and second column, or an average value of the above two elements.

Successively, the polarization rotation angle of the pilot signals is calculated according to the obtained polarization rotation trajectory $\Delta l(t)$:

$$\Delta \theta(t) = 2\arcsin\left(\frac{\Delta l(t)}{2}\right). \quad (37)$$

Finally, the polarization change velocity of the optical link is obtained:

$$f_{Hz}(t) = \frac{f_{rad}(t)}{2\pi} = \frac{\Delta \theta(t)}{2\pi \Delta t}. \quad (38)$$

where, $\Delta \theta(t)$ is the polarization rotation angle of the pilot signals.

For another example, for a case where the PDL in the optical link may not be neglectable, the polarization change in the optical link is denoted by the total polarization estimation matrix, i.e. the polarization change matrix. The polarization change matrix is obtained through calculation by using formula (24) or formula (34).

According to the polarization change matrices at different instants, the differential matrix (i.e. the polarization change matrix between two estimated instants) may be obtained:

$$\Delta M(t) = M_{total}(t) \cdot M_{total}^{-1}(t-\Delta t) \quad (39).$$

As the PDL in the link may not be neglected, normalization needs to be performed on the differential matrix:

$$\Delta M'(t) = \frac{\Delta M(t)}{\sqrt{\det(\Delta M(t))}}; \quad (40)$$

where, $\det(\cdot)$ denotes calculating a determinant of a matrix.

The polarization change velocity in the link is obtained according to formulae (36)-(38).

In addition, the RSOP velocity in the link may also be estimated by using the RSOP estimation matrix obtained by formula (23) or formula (32), a particular process being identical to that in formulae (35)-(38).

The case is described above where the polarization change matrix is estimated first, and then the polarization change velocity of the optical link is estimated according to the polarization change matrices at different instants, that is, the polarization change of the optical link is estimated first, and then the polarization change velocity is estimated.

A case where the polarization change velocity of the optical link is estimated according to the Stokes vectors at different instants shall be described below.

Figure 16:
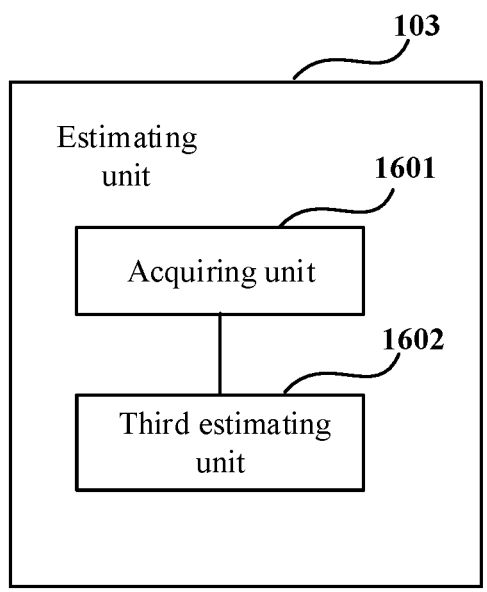
FIG. 16 is a schematic diagram of the estimating unit of Embodiment 1 of this disclosure.

FIG. 16 is another schematic diagram of the estimating unit of Embodiment 1 of this disclosure. As shown in FIG. 16, the estimating unit 103 includes:

an acquiring unit 1601 configured to obtain Stokes vectors of the pilot signals at different time instants; and a third estimating unit 1602 configured to estimate the velocity of a polarization change of the optical link according to the Stokes vectors of the pilot signals at different time instants.

Figure 17:
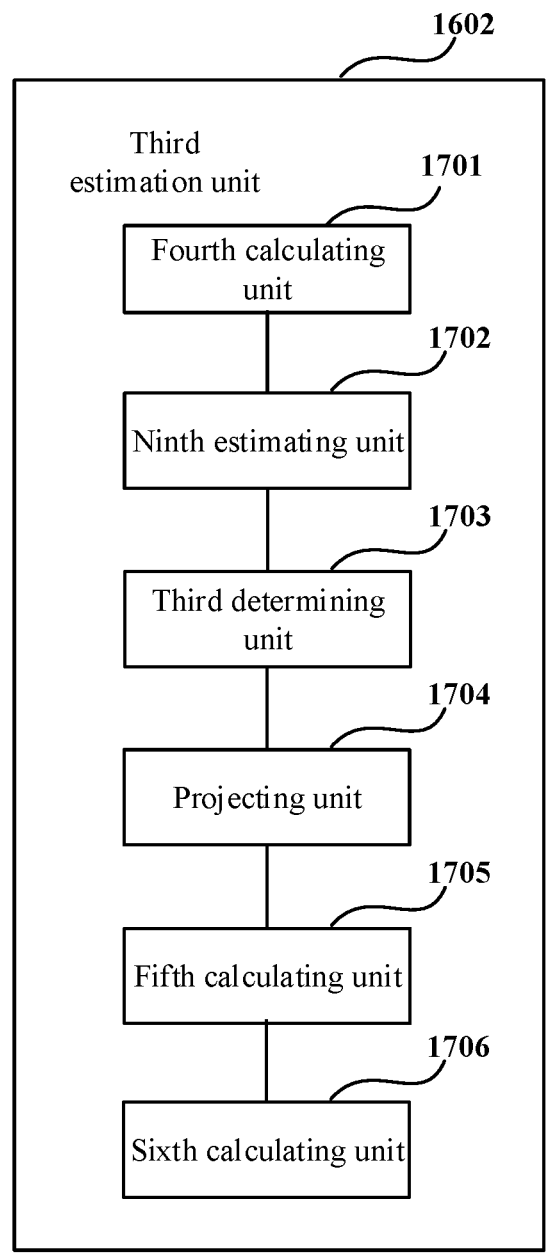
FIG. 17 is a schematic diagram of the third estimating unit of Embodiment 1 of this disclosure.

FIG. 17 is a schematic diagram of the third estimating unit of Embodiment 1 of this disclosure. The third estimation unit 1602 includes:

a fourth calculating unit 1701 configured to obtain polarization change vectors and polarization change vectors of normal vectors of two neighboring types of pilot signals according to Stokes vectors of two neighboring types of pilot signals and the normal vectors at two time instants;

a ninth estimating unit 1702 configured to estimate an axis of rotation vector of rotation of polarization according to the polarization change vectors and polarization change vectors of normal vectors of the two neighboring types of pilot signals;

a third determining unit 1703 configured to determine a rotation plane passing the origin according to the axis of rotation vector;

a projecting unit 1704 configured to project the Stokes vectors of the two neighboring types of pilot signals and normal vectors at the two time instants onto the rotation plane passing the origin to obtain a projection vector;

a fifth calculating unit 1705 configured to calculate a polarization rotation angle of the pilot signals according to the projection vector; and a sixth calculating unit 1706 configured to calculate the velocity of a polarization change of the optical link according to the polarization rotation angle of the pilot signals and the interval between the two time instants.

A calculation process shall be described below in detail.

Figure 18:
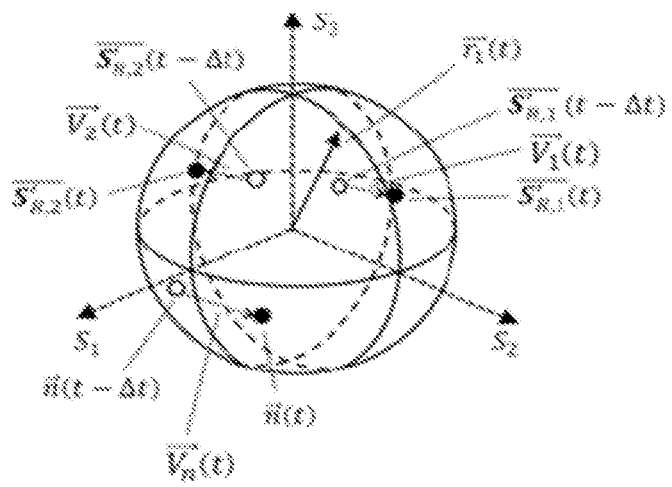
FIG. 18 is a schematic diagram of a state of an estimation process of Embodiment 1 of this disclosure.
Figure 19:
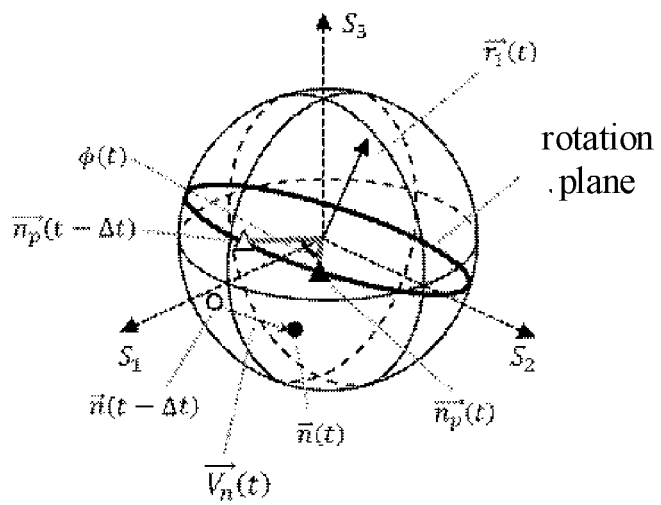
FIG. 19 is a schematic diagram of another state of the estimation process of Embodiment 1 of this disclosure.

FIG. 18 is a schematic diagram of a state of an estimation process of Embodiment 1 of this disclosure, and FIG. 19 is a schematic diagram of another state of the estimation process of Embodiment 1 of this disclosure.

Polarization change vectors constituted at two estimation instants by the Stokes vectors of neighboring two types of pilot signals, such as the Stokes vectors of the first and second types of pilot signals, are $\vec{V}_1 = \overrightarrow{S_{R,1}}(t) - \overrightarrow{S_{R,1}}(t-\Delta t)$ and $\vec{V}_2(t) = \overrightarrow{S_{R,2}}(t) - \overrightarrow{S_{R,2}}(t-\Delta t)$, and a polarization change vector constituted by the normal vector at two estimation instants is $\vec{V}_n(t) = \vec{n}(t) - \vec{n}(t-\Delta t)$, as shown in FIG. 18.

As the polarization change vectors $\vec{V}_1(t)$, $\vec{V}_2(t)$ and $\vec{V}_2(t)$ are orthogonal to the rotation axis, a rotation axis vector $\vec{r}_1(t) = [A, B, C]^T$ may be obtained by cross-multiplying any two polarization change vectors. In order to reduce estimation errors, a rotation axis vector having a largest modulus may be selected for a next step of calculation, or a maximum ratio combination of three rotation axis vectors may be taken as the rotation axis vector for the next step of calculation, or two rotation axis vectors having the largest modulus may be selected first, and the next step of calculation is performed.

According to the rotation axis vector $\vec{r}_1(t)=[A, B, C]^T$, a formula of a rotation plane passing the origin may be directly obtained:

$$AS_1+BS_2+CS_3=0 \quad (41).$$

Respective scaling factors $K_1(t)$, $K_2(t)$, $K_n(t)$, $K_1(t-\Delta t)$, $K_2(t-\Delta t)$ and $K_n(t-\Delta t)$ may be obtained by substituting the Stokes vectors and normal vectors of the pilot signals of type 1 and type 2 at the two estimation instants in the following equation:

$$K = \frac{AS_1 + BS_2 + CS_3}{A^2 + B^2 + C^2}. \quad (42)$$

Then projection vectors of the Stokes vectors and the normal vectors of the pilot signals of type 1 and type 2 at two time instants on the rotation plane passing through the origin are obtained:

$$\vec{S_{R,k,p}}(t)=\vec{S_{R,k}}(t)-K_k(t)\cdot\vec{r}_1(t), k\in[1,2] \quad (43),$$

$$\vec{n}_p(t)=\vec{n}(t)-K_n(t)\cdot\vec{r}_1(t) \quad (44),$$

$$\vec{S_{R,k,p}}(t-\Delta t)=\vec{S_{R,k}}(t-\Delta t)-K_k(t-\Delta t)\cdot\vec{r}_1(t), k\in[1,2] \quad (45),$$

$$\vec{n}_p(t-\Delta t)=\vec{n}(t-\Delta t)-K_n(t-\Delta t)\cdot\vec{r}_1(t) \quad (46).$$

The polarization rotation angle is calculated according to a projection vector to which the polarization change vector having the maximum modulus corresponds. Assuming that a modulus value of $\vec{V}_n(t)$ is maximum, the projection of the normal vector on the rotation plane passing through the origin is shown by the hollow and solid triangles in FIG. 19.

The polarization rotation angle may be obtained through calculation by using the following formula:

$$\Delta\phi(t) = \begin{cases} \arcsin\left(\frac{|\vec{n_p}(t)\times\vec{n_p}(t-\Delta t)|}{|\vec{n_p}(t)||\vec{n_p}(t-\Delta t)|}\right), & \vec{n_p}(t)\cdot\vec{n_p}(t-\Delta t) \geq 0 \\ \pi - \arcsin\left(\frac{|\vec{n_p}(t)\times\vec{n_p}(t-\Delta t)|}{|\vec{n_p}(t)||\vec{n_p}(t-\Delta t)|}\right), & \vec{n_p}(t)\cdot\vec{n_p}(t-\Delta t) < 0 \end{cases} \quad (47)$$

In addition, respective polarization rotation angles may also be calculated according to the three pairs of projection vectors, and then a final rotation angle is obtained by maximum ratio combination. And the polarization rotation velocity is obtained by substituting the rotation angle obtained through calculation in formula (38).

In addition, the rotation direction of the polarization rotation angle is determined by a rotation axis vector $\vec{r}_1(t)$ and a cross-product vector $\vec{n}_p(t-\Delta t)\times\vec{n}_p(t)$. If the two vectors are in the same direction, the rotation direction of the polarization rotation angle is positive, and if the two vectors are inverse, the rotation direction of the polarization rotation angle is negative. Details are as follows:

$$\text{sign}(t) = \begin{cases} 1, & \vec{r}_1(t)\cdot[\vec{n_p}(t-\Delta t)\times\vec{n_p}(t)] \geq 0 \\ -1, & \vec{r}_1(t)\cdot[\vec{n_p}(t-\Delta t)\times\vec{n_p}(t)] < 0 \end{cases} \quad (48)$$

In this case, the polarization change matrix between the two time instants is:

$$U(t) = \cos\left(\frac{\text{sign}(t)\cdot\phi(t)}{2}\right)I - j\sin\left(\frac{\text{sign}(t)\cdot\phi(t)}{2}\right)\left(\frac{\vec{r}_1(t)}{|\vec{r}_1(t)|}\cdot\sigma\right). \quad (49)$$

In the embodiment of this disclosure, for example, as shown in FIG. 1, the apparatus 100 may further include:

a compensating unit 104 configured to perform polarization-dependent loss estimation and polarization-dependent loss compensation on the receiving signal, to estimate the velocity of a polarization change of the optical link based on a polarization-dependent loss compensated receiving signal.

In this way, when the PDL in the optical link is relatively large, the PDL is estimated and compensated first, which may ensure accuracy of estimation of the polarization change.

In the embodiment of this disclosure, the compensating unit 104 may estimate the PDL by using the above formulae (2) and (5)-(8), and perform compensation according to the estimated PDL estimation matrix. For example, the compensating unit 104 may include the converting unit 102 or a module with functions similar to those of the converting unit 102.

It can be seen from the above embodiment that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link. Moreover, they are also applicable to a case where rotation of state of polarization and polarization-dependent loss coexist in the optical link.

Embodiment 2

The embodiment of this disclosure provides a control apparatus for adaptive equalization. The control apparatus for adaptive equalization includes the apparatus for monitoring a polarization change described in Embodiment 1, and reference may be made to Embodiment 1 for a particular structure and functions of the apparatus for monitoring a polarization change, which shall not be described herein any further.

Figure 20:
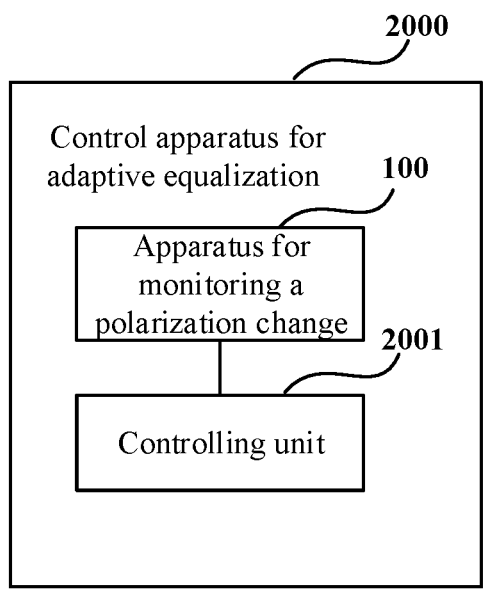
FIG. 20 is a schematic diagram of the control apparatus for adaptive equalization of Embodiment 2 of this disclosure.

FIG. 20 is a schematic diagram of the control apparatus for adaptive equalization of Embodiment 2 of this disclosure. As shown in FIG. 20, a control apparatus 2000 for adaptive equalization includes:

the apparatus 100 for monitoring a polarization change configured to obtain a velocity of a polarization change of an optical link; and a controlling unit 2001 configured to control an update rate of adaptive equalization according to the velocity of a polarization change of the optical link.

In the embodiment of this disclosure, reference may be made to Embodiment 1 for a particular structure and functions of the apparatus 100 for monitoring a polarization change, which shall not be described herein any further.

Figure 21:
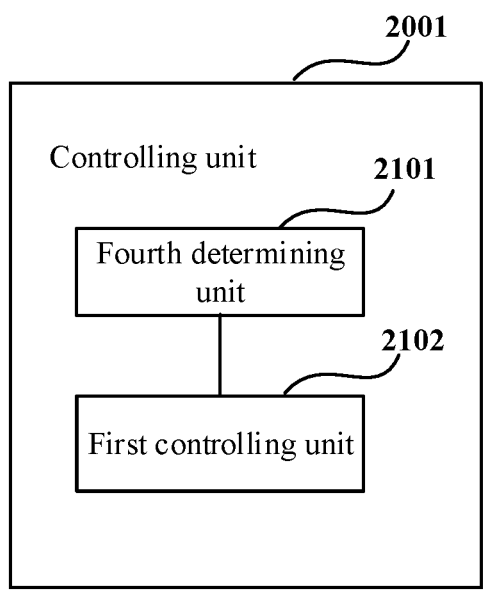
FIG. 21 is a schematic diagram of the controlling unit of Embodiment 2 of this disclosure.

FIG. 21 is a schematic diagram of the controlling unit of Embodiment 2 of this disclosure. As shown in FIG. 21, the controlling unit 2001 includes:

a fourth determining unit 2101 configured to determine an interval to which the monitored polarization change velocity of the optical link belongs according to at least two preset intervals of polarization change velocity; and a first controlling unit 2102 configured to control an AEQ update rate corresponding to the interval to which the polarization change velocity of the optical link belongs.

In the embodiment of this disclosure, multiple intervals of polarization change velocities are stored in advance corresponding to an optimal AEQ update rate, the optimal AEQ update rate being obtained through experiments or simulations.

The fourth determining unit 2101 determines the interval corresponding to the polarization change velocity according to a currently measured polarization change velocity of the optical link, and then determines the AEQ update rate corresponding to the interval, and the first controlling unit 2102 performs control according to the AEQ update rate, so as to reach or be close to the AEQ update rate.

It can be seen from the above embodiment that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link. Moreover, they are also applicable to a case where rotation of state of polarization and polarization-dependent loss coexist in the optical link. And an update interval and update step of the AEQ may be adjusted by using the estimated polarization change of the optical link, thereby lowering overall power consumption of the system.

Embodiment 3

The embodiment of this disclosure provides an optical receiver. The optical receiver includes the apparatus for monitoring a polarization change described in Embodiment 1 or the control apparatus for adaptive equalization described in Embodiment 2, and reference may be made to Embodiment 1 and Embodiment 2 for particular structures and functions of the apparatus for monitoring a polarization change and the control apparatus for adaptive equalization, which shall not be described herein any further.

Following description shall be given by taking that the optical receiver includes the control apparatus for adaptive equalization described in Embodiment 2 as an example.

Figure 22:
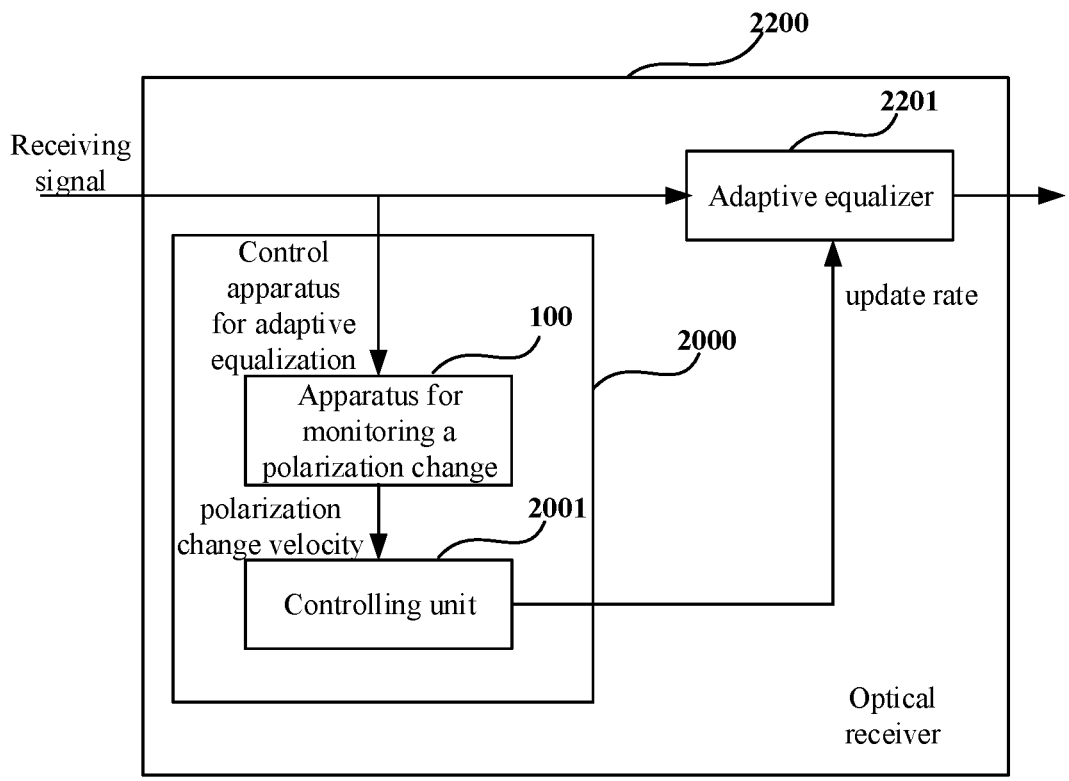
FIG. 22 is a block diagram of a systematic structure of the optical receiver of Embodiment 3 of this disclosure.

FIG. 22 is a block diagram of a systematic structure of the optical receiver of Embodiment 3 of this disclosure. As shown in FIG. 22, an optical receiver 2200 includes the control apparatus 2100 for adaptive equalization and an adaptive equalizer 2201, the control apparatus 2100 for adaptive equalization including the apparatus 100 for monitoring a polarization change and the controlling unit 2101.

As shown in FIG. 22, the apparatus 100 for monitoring a polarization change estimates a polarization change velocity of the optical link based on a receiving signal, and the controlling unit 2101 controls an update rate of the adaptive equalizer 2201 according to the polarization change velocity of the optical link.

In this embodiment, the optical receiver 2200 does not necessarily include all the components shown in FIG. 22; and furthermore, the optical receiver 2200 may include components not shown in FIG. 22, and reference may be made to related technologies for detailed contents.

In this embodiment, functions of the control apparatus 2100 for adaptive equalization may be executed by a processor of the optical receiver, such as a digital signal processor (DSP) of the receiver.

It can be seen from the above embodiment that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link. Moreover, they are also applicable to a case where rotation of state of polarization and polarization-dependent loss coexist in the optical link. And an update interval and update step of the AEQ may be adjusted by using the estimated polarization change of the optical link, thereby lowering overall power consumption of the system.

Embodiment 4

The embodiment of this disclosure provides a method for monitoring a polarization change, corresponding to the apparatus for monitoring a polarization change in Embodiment 1.

Figure 23:
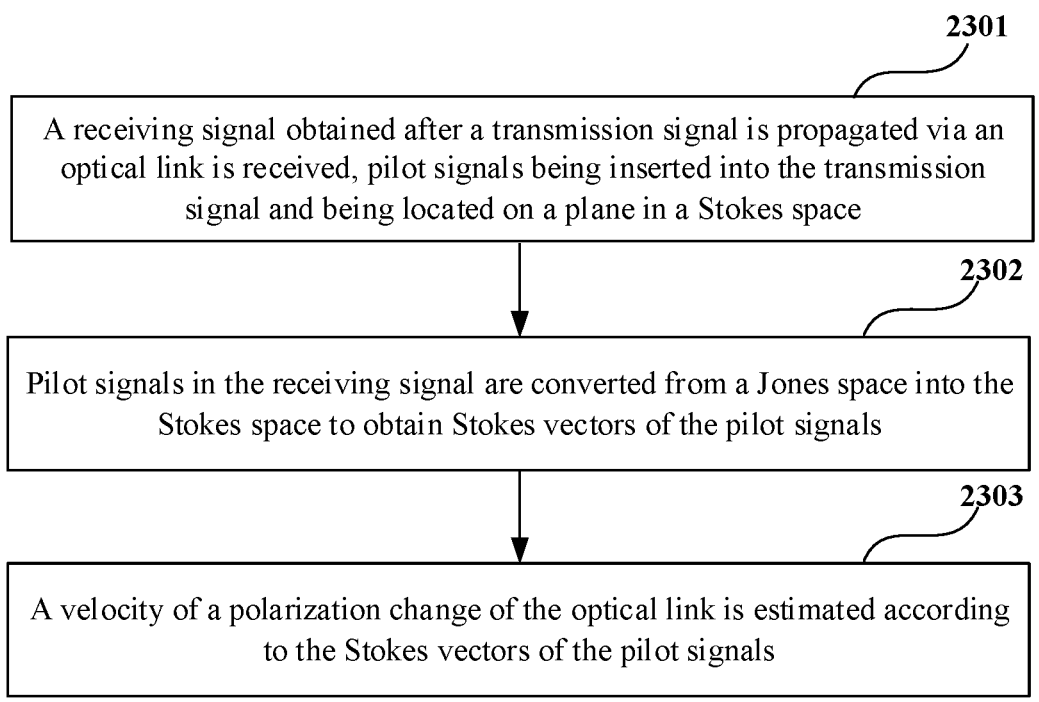
FIG. 23 is a schematic diagram of the method for monitoring a polarization change of Embodiment 4 of this disclosure.

FIG. 23 is a schematic diagram of the method for monitoring a polarization change of Embodiment 4 of this disclosure. As shown in FIG. 23, the method includes:

Step 2301: a receiving signal obtained after a transmission signal is propagated via an optical link is received, pilot signals being inserted into the transmission signal and being located on a plane in a Stokes space;

Step 2302: pilot signals in the receiving signal are converted from a Jones space into the Stokes space to obtain Stokes vectors of the pilot signals; and Step 2303: a velocity of a polarization change of the optical link is estimated according to the Stokes vectors of the pilot signals.

In this embodiment, reference may be made to the implementations of the units in Embodiment 1 for execution of the above steps, which shall not be described herein any further.

It can be seen from the above embodiment that by inserting pilot signals in a transmission signal and converting the pilot signals in the receiving signal from a Jones space into a Stokes space, a velocity of a polarization change of the optical link is estimated by using the Stokes vectors of the pilot signals, thereby directly and accurately estimating the polarization change of the optical link. Moreover, they are also applicable to a case where rotation of state of polarization and polarization-dependent loss coexist in the optical link. And an update interval and update step of the AEQ may be adjusted by using the estimated polarization change of the optical link, thereby lowering overall power consumption of the system.

An embodiment of this disclosure provides a computer readable program, which, when executed in an apparatus for monitoring a polarization change or an optical receiver, will cause a computer to carry out the method for monitoring a polarization change as described in Embodiment 3 in the apparatus for monitoring a polarization change or the optical receiver.

An embodiment of this disclosure provides a storage medium storing a computer readable program, which will cause a computer to carry out the method for monitoring a polarization change as described in Embodiment 3 in an apparatus for monitoring a polarization change or an optical receiver.

Carrying out the method for monitoring a polarization change in the apparatus for monitoring a polarization change or the optical receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 23. And the hardware module, for example, may be carried out by firming the software modules by using a field programmable gate array (FPGA).

The software modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The software modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the software modules may be stored in the MEGA-SIM card or the flash memory device of a large capacity.

One or more functional blocks and/or one or more combinations of the functional blocks in FIG. 3 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further disclosed in the embodiments of this disclosure.

Supplements:

1. An apparatus for monitoring a polarization change, the apparatus including: a receiving unit configured to receive a receiving signal obtained after a transmission signal is propagated via an optical link, pilot signals being inserted into the transmission signal and being located on a plane in a Stokes space; a converting unit configured to convert pilot signals in the receiving signal from a Jones space into the Stokes space to obtain Stokes vectors of the pilot signals; and an estimating unit configured to estimate a velocity of a polarization change of the optical link according to the Stokes vectors of the pilot signals.

2. The apparatus according to supplement 1, wherein the estimating unit includes: a first estimating unit configured to estimate a polarization change matrix according to the Stokes vectors of the pilot signals; and a second estimating unit configured to estimate the velocity of a polarization change of the optical link according to polarization change matrices at different time instants.

3. The apparatus according to supplement 1, wherein the estimating unit includes: an acquiring unit configured to obtain Stokes vectors of the pilot signals at different time instants; and a third estimating unit configured to estimate the velocity of a polarization change of the optical link according to the Stokes vectors of the pilot signals at different time instants.

4. The apparatus according to supplement 2, wherein the first estimating unit includes: a first calculating unit configured to perform classified averaging on the Stokes vectors of the pilot signals; a fourth estimating unit configured to estimate a polarization-dependent loss (PDL) estimation matrix and a rotation of state of polarization (RSOP) estimation matrix, or estimate a rotation of state of polarization estimation matrix, according to a classified averaged Stokes vector of the pilot signals; and a first determining unit configured to determine the polarization change matrix according to the polarization-dependent loss estimation matrix and the rotation of state of polarization estimation matrix, or take the rotation of state of polarization estimation matrix as the polarization change matrix.

5. The apparatus according to supplement 4, wherein the fourth estimating unit includes: a fifth estimating unit configured to estimate the polarization-dependent loss estimation matrix according to a barycentric coordinate of the classified averaged Stokes vector of the pilot signals and perform polarization-dependent loss compensation; and a sixth estimating unit configured to estimate the rotation of state of polarization estimation matrix according to a polarization-dependent loss compensated Stokes vector of the pilot signals.

6. The apparatus according to supplement 4, wherein the fourth estimating unit includes: a seventh estimating unit configured to estimate the rotation of state of polarization estimation matrix according to the classified averaged Stokes vector of the pilot signals and perform rotation of state of polarization compensation; and an eighth estimating unit configured to estimate the polarization-dependent loss estimation matrix according to a barycentric coordinate of the rotation of state of polarization compensated Stokes vectors of the pilot signals.

7. The apparatus according to supplement 2, wherein the second estimating unit includes: a second determining unit configured to determine a differential matrix of the polarization change matrices at two time instants; a second calculating unit configured to calculate a polarization rotation angle of the pilot signals according to the differential matrix; and a third calculating unit configured to calculate the velocity of a polarization change of the optical link according to the polarization rotation angle of the pilot signals and an interval between the two time instants.

8. The apparatus according to supplement 3, wherein the third estimating unit includes: a fourth calculating unit configured to obtain polarization change vectors and polarization change vectors of normal vectors of two neighboring types of pilot signals according to Stokes vectors of two neighboring types of pilot signals and the normal vectors at two time instants; a ninth estimating unit configured to estimate an axis of rotation vector of rotation of polarization according to the polarization change vectors and polarization change vectors of normal vectors of the two neighboring types of pilot signals; a third determining unit configured to determine a rotation plane passing the origin according to the axis of rotation vector; a projecting unit configured to project the Stokes vectors of the two neighboring types of pilot signals and normal vectors at the two time instants onto the rotation plane passing the origin to obtain a projection vector; a fifth calculating unit configured to calculate a polarization rotation angle of the pilot signals according to the projection vector; and a sixth calculating unit configured to calculate the velocity of a polarization change of the optical link according to the polarization rotation angle of the pilot signals and the interval between the two time instants.

9. The apparatus according to supplement 1, wherein the apparatus further includes: a compensating unit configured to perform polarization-dependent loss estimation and polarization-dependent loss compensation on the receiving signal, to estimate the velocity of a polarization change of the optical link based on a polarization-dependent loss compensated receiving signal.

10. A control apparatus for adaptive equalization, the apparatus including: the apparatus for monitoring a polarization change as described in supplement 1 configured to obtain a velocity of a polarization change of the optical link; and a controlling unit configured to control an update rate of adaptive equalization according to the velocity of a polarization change of the optical link.

11. The apparatus according to supplement 10, wherein the controlling unit includes: a fourth determining unit configured to determine an interval to which the monitored polarization change velocity of the optical link belongs according to at least two preset intervals of polarization change velocity; and a first controlling unit configured to control an AEQ update rate corresponding to the interval to which the polarization change velocity of the optical link belongs.

12. An optical receiver, including the apparatus as described in supplement 1 or 10.

13. A method for monitoring a polarization change, the method including: receiving a receiving signal obtained after a transmission signal is propagated via an optical link, pilot signals being inserted into the transmission signal and being located on a plane in a Stokes space; converting pilot signals in the receiving signal from a Jones space into the Stokes space to obtain Stokes vectors of the pilot signals; and estimating a velocity of a polarization change of the optical link according to the Stokes vectors of the pilot signals.

14. The method according to supplement 13, wherein the estimating a velocity of a polarization change of the optical link according to the Stokes vectors of the pilot signals includes: estimating a polarization change matrix according to the Stokes vectors of the pilot signals; and estimating the velocity of a polarization change of the optical link according to polarization change matrices at different time instants.

15. The method according to supplement 13, wherein the estimating a velocity of a polarization change of the optical link according to the Stokes vectors of the pilot signals includes: obtaining Stokes vectors of the pilot signals at different time instants; and estimating the velocity of a polarization change of the optical link according to the Stokes vectors of the pilot signals at different time instants.

16. The method according to supplement 15, wherein the estimating a polarization change matrix according to the Stokes vectors of the pilot signals includes: performing classified averaging on the Stokes vectors of the pilot signals; estimating a polarization-dependent loss estimation matrix and a rotation of state of polarization estimation matrix, or estimating a rotation of state of polarization estimation matrix, according to a classified averaged Stokes vector of the pilot signals; and determining the polarization change matrix according to the polarization-dependent loss estimation matrix and the rotation of state of polarization estimation matrix, or taking the rotation of state of polarization estimation matrix as the polarization change matrix.

17. The method according to supplement 16, wherein the estimating a polarization-dependent loss estimation matrix and a rotation of state of polarization estimation matrix according to a classified averaged Stokes vector of the pilot signals includes: estimating the polarization-dependent loss estimation matrix according to a barycentric coordinate of the classified averaged Stokes vector of the pilot signals and performing polarization-dependent loss compensation; and estimating the rotation of state of polarization estimation matrix according to a polarization-dependent loss compensated Stokes vector of the pilot signals.

18. The method according to supplement 16, wherein the estimating a polarization-dependent loss estimation matrix and a rotation of state of polarization estimation matrix according to a classified averaged Stokes vector of the pilot signals includes: estimating the rotation of state of polarization estimation matrix according to the classified averaged Stokes vector of the pilot signals and performing rotation of state of polarization compensation; and estimating the polarization-dependent loss estimation matrix according to a barycentric coordinate of the rotation of state of polarization compensated Stokes vector of the pilot signals.

19. The method according to supplement 16, wherein the estimating the velocity of a polarization change of the optical link according to polarization change matrices at different time instants includes: determining a differential matrix of the polarization change matrix at two time instants; calculating a polarization rotation angle of the pilot signals according to the differential matrix; and calculating the velocity of a polarization change of the optical link according to the polarization rotation angle of the pilot signals and an interval between the two time instants.

20. The method according to supplement 15, wherein the estimating the velocity of a polarization change of the optical link according to the Stokes vectors at different time instants includes: obtaining polarization change vectors and polarization change vectors of normal vectors of two neighboring types of pilot signals according to Stokes vectors of two neighboring types of pilot signals and the normal vectors at two time instants; estimating an axis of rotation vector of rotation of polarization according to the polarization change vectors and polarization change vectors of normal vectors of the two neighboring types of pilot signals; determining a rotation plane passing the origin according to the axis of rotation vector; projecting the Stokes vectors of the two neighboring types of pilot signals and normal vectors at the two time instants onto the rotation plane passing the origin to obtain a projection vector; calculating a polarization rotation angle of the pilot signals according to the projection vector; and calculating the velocity of a polarization change of the optical link according to the polarization rotation angle of the pilot signals and the interval between the two time instants.

21. The method according to supplement 13, wherein the method further includes: performing polarization-dependent loss estimation and polarization-dependent loss compensation on the receiving signal, to estimate the velocity of a polarization change of the optical link based on a polarization-dependent loss compensated receiving signal.

22. A control method for adaptive equalization, the method including: the method for monitoring a polarization change as described in supplement 13 for obtaining a velocity of a polarization change of the optical link; and controlling an update rate of adaptive equalization according to the velocity of a polarization change of the optical link.

23. The method according to supplement 22, wherein the controlling a an update rate of adaptive equalization according to the velocity of a polarization change of the optical link includes: determining an interval to which the monitored polarization change velocity of the optical link belongs according to at least two preset intervals of polarization change velocity; and controlling an AEQ update rate corresponding to the interval to which the polarization change velocity of the optical link belongs.

The invention claimed is:

1. An apparatus to monitor a polarization change, comprising:
    a memory; and
    a computing hardware coupled to the memory to,
        receive a receiving signal obtained after a transmission signal is propagated via an optical link, pilot signals being inserted into the transmission signal and being located on a plane in a Stokes space;
        convert the pilot signals received in a Jones space in the receiving signal from the Jones space into the Stokes space to obtain Stokes vectors of the pilot signals; and
        estimate a velocity of a polarization change of the optical link according to the Stokes vectors of the pilot signals.

2. The apparatus according to claim 1, wherein to estimate the velocity of the polarization change, the computing hardware is further to:
    estimate a polarization change matrix according to the Stokes vectors of the pilot signals; and
    estimate the velocity of the polarization change of the optical link according to polarization change matrices at different time instants.

3. The apparatus according to claim 2, wherein to estimate the polarization change matrix according to the Stokes vectors of the pilot signals, the computing hardware is further to:
    perform classified averaging on the Stokes vectors of the pilot signals;
    estimate a polarization-dependent loss (PDL) estimation matrix and a rotation of state of polarization (RSOP) estimation matrix, or estimate the RSOP estimation matrix, according to the classified averaged Stokes vector of the pilot signals; and
    determine the polarization change matrix according to the PDL estimation matrix and the RSOP estimation matrix, or take the RSOP estimation matrix as the polarization change matrix.

4. The apparatus according to claim 3, wherein to estimate the PDL estimation matrix, or the RSOP estimation matrix, the computing hardware is further to:
    estimate the PDL estimation matrix according to a barycentric coordinate of the classified averaged Stokes vector of the pilot signals and perform PDL compensation; and
    estimate the RSOP estimation matrix according to a PDL compensated Stokes vector of the pilot signals.

5. The apparatus according to claim 3, wherein to estimate the PDL estimation matrix, or the RSOP estimation matrix, the computing hardware is further to:
    estimate the RSOP estimation matrix according to the classified averaged Stokes vector of the pilot signals and perform RSOP compensation; and
    estimate the PDL estimation matrix according to a barycentric coordinate of the RSOP compensated Stokes vectors of the pilot signals.

6. The apparatus according to claim 2, wherein to estimate the velocity of the polarization change of the optical link according to polarization change matrices at different time instants, the computing hardware is further to:
    determine a differential matrix of the polarization change matrices at two time instants;
    calculate a polarization rotation angle of the pilot signals according to the differential matrix; and
    calculate the velocity of a polarization change of the optical link according to the polarization rotation angle of the pilot signals and an interval between the two time instants.

7. The apparatus according to claim 1, wherein to estimate the velocity of the polarization change, the computing hardware is further to:
    obtain Stokes vectors of the pilot signals at different time estimate the velocity of the polarization change of the optical link according to the Stokes vectors of the pilot signals at different time instants.

8. The apparatus according to claim 7, wherein to estimate the velocity of the polarization change of the optical link according to the Stokes vectors of the pilot signals at different time instants, the computing hardware is further to:
    obtain polarization change vectors and polarization change vectors of normal vectors of two neighboring types of pilot signals according to Stokes vectors of the two neighboring types of pilot signals and the normal vectors at two time instants;
    estimate an axis of rotation vector of rotation of polarization according to the polarization change vectors and the polarization change vectors of normal vectors of the two neighboring types of pilot signals;
    determine a rotation plane passing an origin according to the axis of rotation vector;
    project the Stokes vectors of the two neighboring types of pilot signals and the normal vectors at the two time instants onto the rotation plane passing the origin to obtain a projection vector;
    calculate a polarization rotation angle of the pilot signals according to the projection vector; and
    calculate the velocity of a polarization change of the optical link according to the polarization rotation angle of the pilot signals and the interval between the two time instants.

9. The apparatus according to claim 1, wherein the computing hardware is further to:
    perform a polarization-dependent loss (PDL) estimation and a PDL compensation on the receiving signal, to estimate the velocity of a polarization change of the optical link based on PDL compensated receiving signal.

10. A control apparatus to perform adaptive equalization, comprising:
    a memory; and
    a computing hardware coupled to the memory to,
        monitor a polarization change as claimed in claim 1 to obtain a velocity of a polarization change of the optical link; and
        control an update rate of adaptive equalization according to the velocity of the polarization change of the optical link.

* * * * *